(12) United States Patent
Townsend et al.

(10) Patent No.: US 7,658,406 B2
(45) Date of Patent: Feb. 9, 2010

(54) VENTING DEVICE FOR AN AIRBAG INFLATOR

(75) Inventors: Richard Townsend, St. Petersburg, FL (US); Alexander Deych, Plant City, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 364 days.

(21) Appl. No.: 11/781,254

(22) Filed: Jul. 22, 2007

(65) Prior Publication Data

US 2009/0020990 A1    Jan. 22, 2009

(51) Int. Cl.
B60R 21/26 (2006.01)

(52) U.S. Cl. ........................ 280/737; 280/736

(58) Field of Classification Search .............. 280/736, 280/739, 737
See application file for complete search history.

(56) References Cited

U.S. PATENT DOCUMENTS

| | | | |
|---|---|---|---|
| 3,788,596 A | 1/1974 | Maeda | |
| 3,806,153 A | 4/1974 | Johnson | |
| 4,203,616 A | 5/1980 | Okada | |
| 4,289,327 A | 9/1981 | Okada | |
| 5,350,192 A | 9/1994 | Blumenthal | |
| 5,351,988 A | 10/1994 | Bishop et al. | |
| 5,603,525 A | 2/1997 | Zakula | |
| 5,678,856 A | 10/1997 | Headley | |
| 6,010,153 A | 1/2000 | Halas et al. | |
| 6,029,995 A | 2/2000 | Fink | |
| 6,062,599 A | 5/2000 | Forbes et al. | |
| 6,089,601 A | 7/2000 | Shirk et al. | |
| 6,189,926 B1 * | 2/2001 | Smith ..................... 280/737 |
| 6,206,420 B1 | 3/2001 | Skanborg et al. | |
| 6,217,065 B1 | 4/2001 | Al-Amin et al. | |
| 6,247,725 B1 | 6/2001 | Moller | |
| 6,412,811 B1 | 7/2002 | Campbell et al. | |
| 6,726,241 B2 | 4/2004 | Welz | |
| 6,830,264 B2 | 12/2004 | Al-Amin | |
| 6,908,106 B2 | 6/2005 | Campbell et al. | |
| 7,131,663 B1 | 11/2006 | Campbell et al. | |
| 2007/0075536 A1 | 4/2007 | Kelley et al. | |

FOREIGN PATENT DOCUMENTS

DE    29714433 U1    11/1997
GB    2316475 A    2/1998

\* cited by examiner

*Primary Examiner*—Eric Culbreth
(74) *Attorney, Agent, or Firm*—Lonnie P. Drayer; Markell Seiteman (57) ABSTRACT

A device for supporting a rupturable closure member of a pressure vessel, such as an airbag inflator has a hollow support with a tapered portion and an adjoining cylindrical portion. An exterior surface of the tapered portion has longitudinally extending grooves therein. An igniter is located adjacent the cylindrical portion of the support and a pyrotechnic substance is located in the cylindrical portion of the support between the igniter and the tapered portion of the support. A rupturable closure member being forced against an open first end of the tapered portion of the support by the gas in the pressure vessel such that a chamber is formed within the support. The igniter when activated ignites the pyrotechnic substance and the burning pyrotechnic substance generates gas under pressure that causes the tapered portion of the support to break along the longitudinally extending grooves and no longer support the rupturable closure member allowing the gas in the pressure vessel to rupture the unsupported rupturable closure member.

12 Claims, 11 Drawing Sheets

VENTING DEVICE FOR AN AIRBAG INFLATOR

BACKGROUND OF THE INVENTION

The present invention relates generally to a device for causing a gas tight seal of a vessel containing gas to rupture, and more specifically to a device for venting gas from an airbag inflator.

1. Field of the Invention

Motor vehicles are provided with airbags to restrain the movement of vehicle occupants in a crash. Airbags are inflated with gasses that are generated by, stored in, or both generated by and stored in airbag inflators. Airbag inflators are often pressure vessels that are sealed with rupturable membranes that are caused to fail in a selected manner at a selected time to release gasses to the airbag. In some airbag inflators the rupturable seal may simply be burst open by pressure inside the inflator due to the gas pressure resulting from the generation of inflation gasses by burning gas generants inside the inflator housing or heating gasses stored in the inflator housing by burning a pyrotechnic material. However, some airbag inflators employ venting devices that cause a seal to fail in response to a signal from a control device and the present invention relates to an improved venting device of this category.

2. Discussion of the Prior Art

One manner of selectively causing a rupturable member to fail is to activate a small pyrotechnic device that generates hot gas and a shock wave to impact the rupturable member and blow an opening through the rupturable member. Examples of such venting devices are disclosed for example in U.S. Pat. No. 5,678,856 B1 and U.S. Pat. No. 6,062,599 B1.

The use of a projectile or piercing member to punch a hole in a rupturable member is disclosed for example in U.S. Pat. No. 3,806,153 B1 and U.S. Pat. No. 6,010,153 B1. The very precise tolerances required to make such venting devices work consistently can be very costly.

Because gas pressure in a pressure vessel like and airbag inflator can be very high, on the order of 1,400 kilogram per square centimeter (20,000 pounds per square inch) the rupturable member must be fairly robust making it difficult for smaller pyrotechnic devices to cause the rupturable members to fail in a consistent manner. Another limitation is the surface area of the rupturable member subjected to such high stresses is limited. Another manner of causing a rupturable member to fail is to support a surface of the rupturable member opposite the pressurized gas with a support or pillar, then remove the support provided or pillar allowing the gas pressure to cause the rupturable member to fail. Examples of such venting devices are disclosed for example in: DE 299 14 433 U1; GB 2 316 475 A; U.S. Pat. No. 3,788,596 B1; U.S. Pat. No. 4,203,616 B1; U.S. Pat. No. 4,289,327 B1; U.S. Pat. No. 5,603,525 B1; U.S. Pat. No. 6,206,420 B1; U.S. Pat. No. 6,217,065; U.S. Pat. No. 6,247,725 B1; U.S. Pat. No. 6,412,811 B1; and U.S. Pat. No. 6,830,264 B2.

Still other venting devices employ both a support and a pyrotechnic device to cause a rupturable seal to fail. U.S. Pat. No. 6,908,106 B2 and U.S. Pat. No. 7,131,663 B1 teach a device for opening a container storing the inflation fluid under pressure. The container has an outlet passage through which the inflation fluid flows from the container. A rupturable closure member is fixed to the container and blocks the flow of inflation fluid through the passage. A support for the rupturable closure member defines a chamber adjacent the rupturable closure member. The rupturable closure member has a first portion deformed into the chamber by the pressure of the inflation fluid and a second ring-shaped portion encircling the first portion. An igniter ruptures the closure member when actuated by shearing the first portion of the now ruptured closure member from the now opened second ring shaped portion. U.S. Pat. No. 6,908,106 B2 and U.S. Pat. No. 7,131,663 B1 teach that the support remains intact during the venting operation so the only way for gasses to exit the container is to pass around the exterior of the support which limits the cross sectional area of the passageway for the gas being vented. This is a problem when the function of a venting device is to vent gas from the container as rapidly as possible, for instance to restrict the force of a deploying airbag on an out-of-position or small vehicle occupant.

U.S. Pat. No. 6,029,995 B1 teaches a support structure in the shape of a cup with the base of the cup adjoining a rupturable closure member in a load bearing relationship so as to transmit a storage pressure force from the closure member to the inflator structure. Preferably, the cylindrical sidewall of the support cup has a plurality of axially extending score lines that are spaced apart circumferentially about its periphery. Each score line defines a coextensive stress riser that is rupturable under the influence of the combustion products emitted from an igniter. This facilitates rupturing of the support cup radially outward at the periphery of the cylindrical body. The fluid storage pressure acting outward against the end wall of the support cup also facilitates peripheral rupturing of the cylindrical body by blocking movement of the end wall into the chamber under the influence of the combustion products in the support cup. However, there is no teaching in U.S. Pat. No. 6,029,995 B1 that the end wall of the support cup does not remain intact and as such remains an obstacle to the evacuation of gasses from the pressure vessel.

SUMMARY OF THE INVENTION

A venting device according to the present invention solves the problems with prior art venting devices with a deformable support that supports a rupturable closure member to prevent failure of the closure member but allows a very rapid venting of gasses from the pressure vessel by providing a less obstructed gas venting passageway than venting devices such as those taught in U.S. Pat. No. 6,029,995 B1, U.S. Pat. No. 6,908,106 B2 and U.S. Pat. No. 7,131,663 B1.

DETAILED DESCRIPTION OF THE INVENTION

Figure 1:
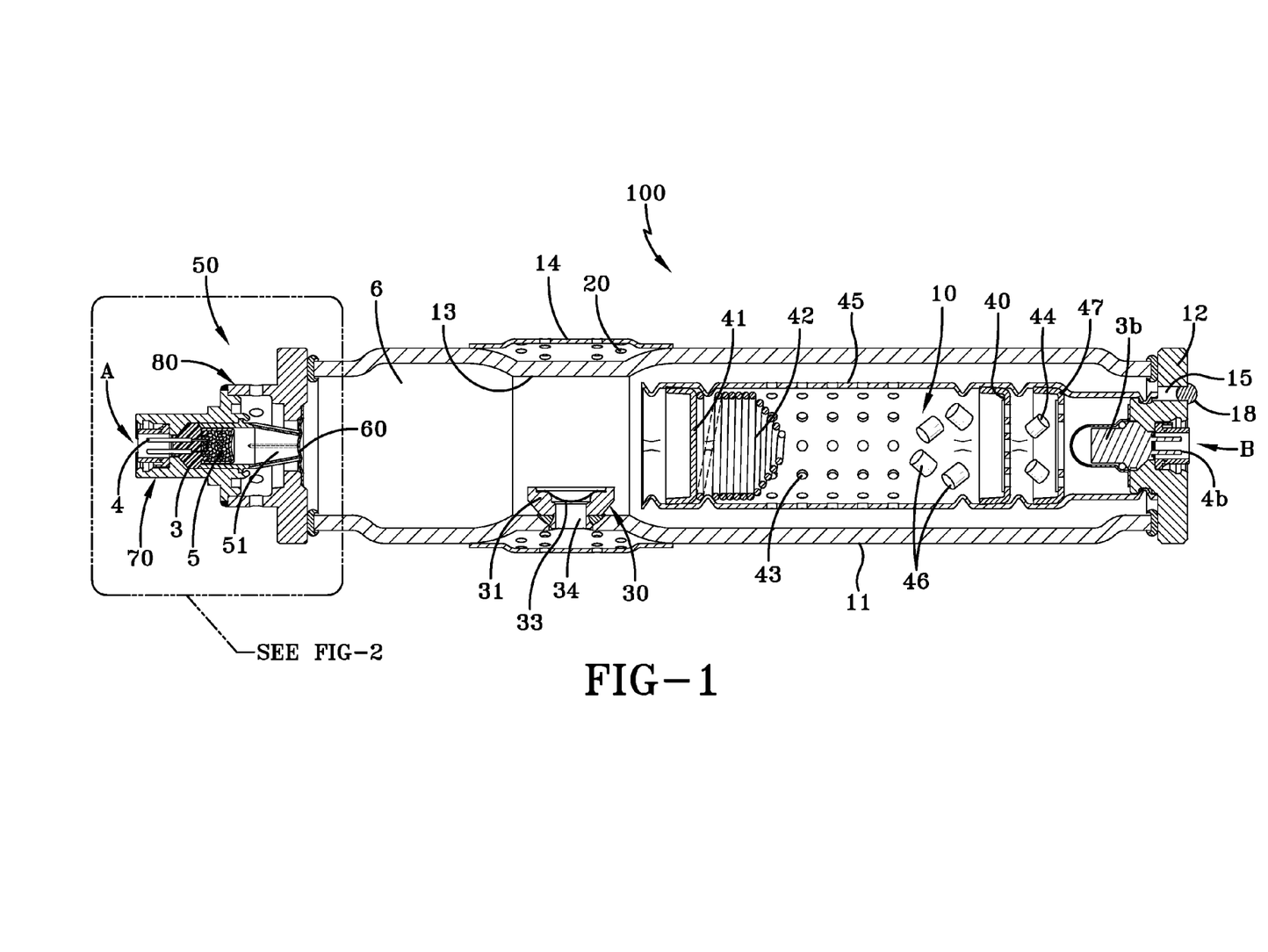
FIG. 1 is a longitudinal cross section of a hybrid airbag inflator with a venting device according to the present invention.

FIG. 1 is a longitudinal cross section of a hybrid airbag inflator 100 with a venting device 50 according to the present invention. A hybrid airbag inflator with the same basic structure but with a different venting device is disclosed in US 2007/0075536 A1 which in incorporated herein in its entirety for the purpose of teaching a hybrid airbag inflator that may be fitted with a venting device according to the present invention. The hybrid airbag inflator 100 has a single heater assembly 10 attached at a closed end of the tubular inflator housing 11. As shown the heater assembly 10 is attached to an end cap 12 that is welded or otherwise securely attached to the tubular inflator housing 11. The end cap 12 has a fill port opening 15 to provide an access to charge the inflator with inert gas 6 under pressure. The inflator fill port opening 15 is then sealed with a plug 18.

The heater assembly 10 comprises a tubular housing 45 containing an ignition enhancer composition 44 and a gas generant 46. The ignition enhancer composition 44 is separated from the gas generant 46 by a bulkhead 40 having passageways therethrough. An additional bulkhead structure 47 retains the enhancer composition in the housing 45. The gas generant is further retained in the tubular housing 45 of the heater assembly 10 by an end cap 41. A cushioning member such as a spring 42 adjacent to the end cap 41 dampens the shifting of the gas generant 46 in the tubular housing 45. The portion of the tubular housing 45 adjoining the gas generant 46 has openings 43 therethrough.

As shown a primary vent port assembly 30 is welded or otherwise affixed to the tubular inflator housing 11 and spaced apart from and between the ends A, B of the tubular inflator housing 11. The vent port assembly 30 has a round washer shaped body 31 with a passage 34 through the washer shaped body 31 and the tubular inflator housing 11. The vent port assembly includes a concave burst disk 33.

A signal is electrically passed to electrical connectors 4b to activate an igniter 3b fixed to the end cap 12. The igniter 3b ignites the ignition enhancing composition 44. The burning ignition enhancing composition 44 in turn ignites the gas generant 46 to generate hot gasses that help in inflating an airbag and also heat the inert gas 6 stored in the tubular inflator housing 11 to increase the gas pressure inside the tubular inflator housing. When the gas pressure inside the tubular inflator housing 11 exceeds a predetermined value, at least one rupturable member, such as the burst disk 33 of the vent port assembly 30 ruptures and the inflation gasses pass through the passage 34. The exiting inflation gasses flow under a manifold 14 covering a reduced diameter section 13 of the tubular inflator housing 11 and through small openings 20 in the manifold 14 to deploy and inflate an airbag (not shown).

In the event that a controller (not shown) determines a vehicle occupant that the airbag is intended to restrain is out-of-position or of a small size and the airbag deployment needs to be terminated or slowed, a signal can be electronically sent to a gas venting device 50 to open a rupturable closure member 60 sealing a second end A of the tubular inflator housing 11.

Figure 2:
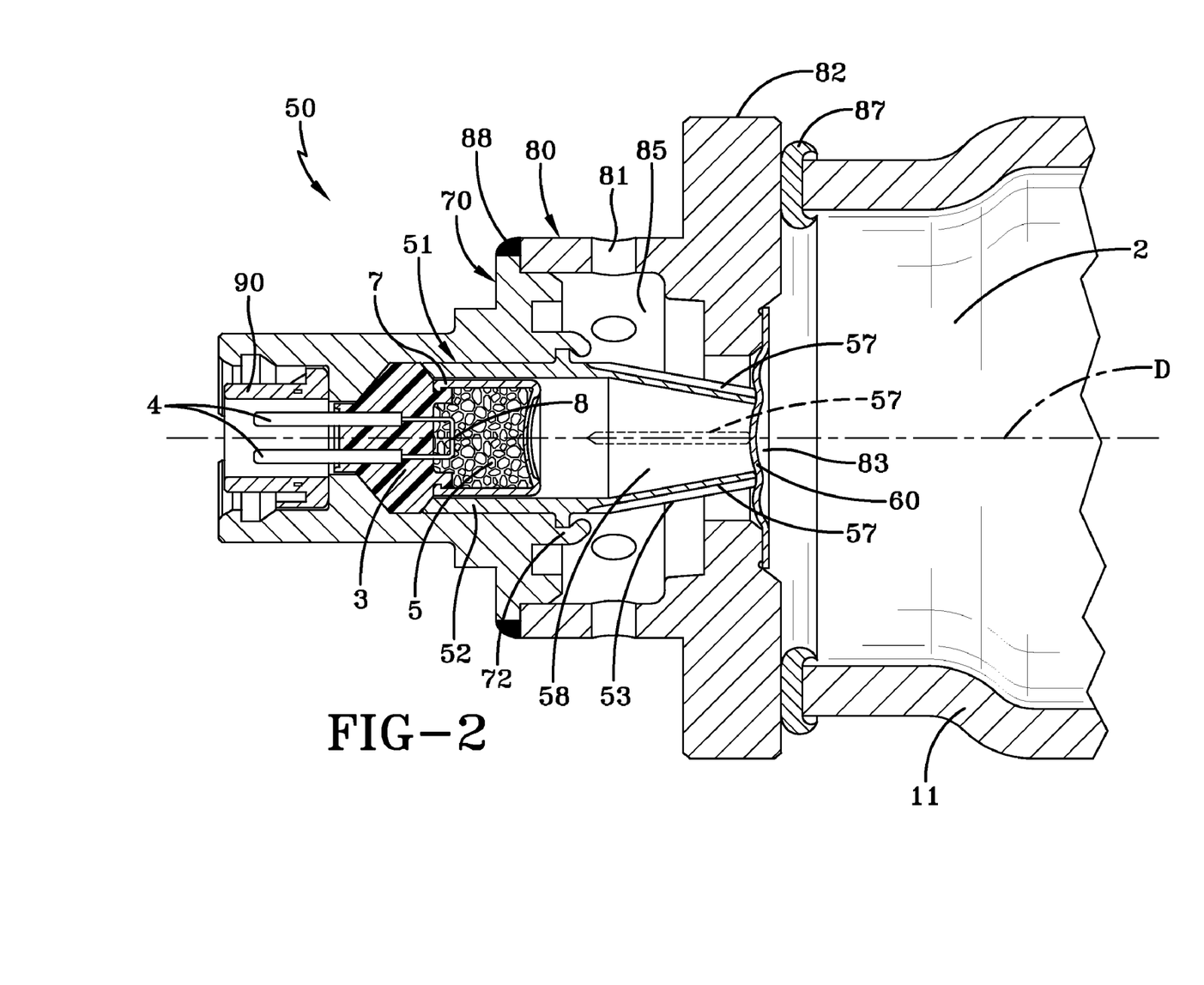
FIG. 2 is an enlarged longitudinal cross section of the new venting device.
Figure 9:
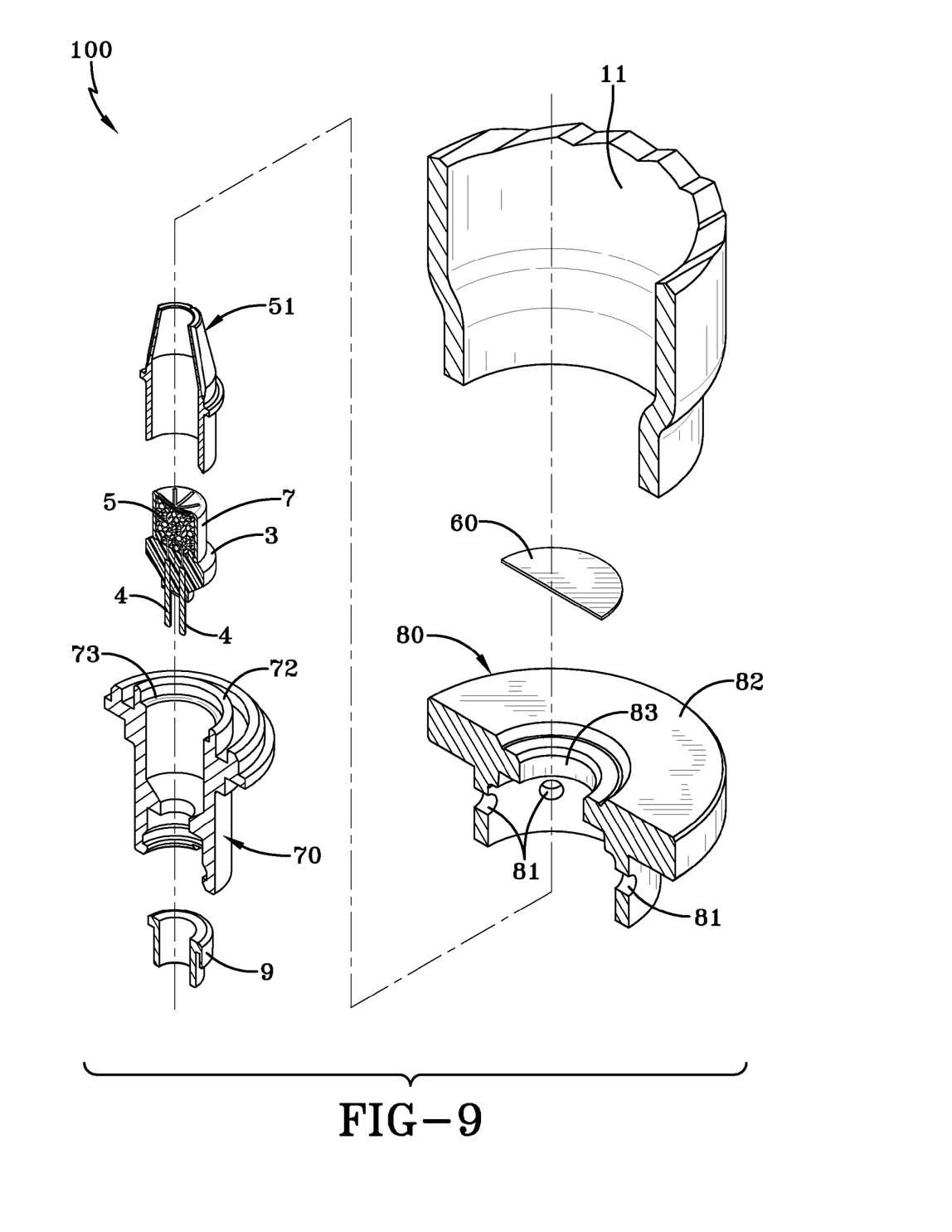
FIG. 9 is an exploded longitudinal cross section in perspective of the venting device.

With reference to FIGS. 1, 2 and 9 the structure of the new gas venting device 50 includes a hollow vent housing 80 having an end wall 82 fixed to one end of the tubular inflator housing 11. The vent housing has a longitudinal axis D that is coaxial with the longitudinal axis D of the tubular inflator housing 11. The end wall 82 of the vent housing has a gas outlet passage 83 therethrough such that an interior chamber 85 of the vent housing 80 communicates with an interior chamber 2 of the inflator housing 11 via the gas outlet passage 83. A rupturable closure member 60 is fixed to the vent housing 80 blocking the flow of gas through the gas outlet passage 83. In an exemplary embodiment, used in the testing that will be described later, the gas outlet passage 83 has a diameter of twelve millimeters. When the rupturable closure member 60 is ruptured gas from the interior chamber 2 of the inflator housing passes through the gas outlet passage 83 to the interior chamber 85 of the vent housing. The vent housing has at least one gas escape opening 81 therethrough oriented radially with respect to the longitudinal axis D of the vent housing to allow gas to pass from inside the vent housing to outside the vent housing and the inflator.

A hollow support housing 70 is fixed to the vent housing 80. The hollow support housing has a longitudinal axis D that is coaxial with the longitudinal axes D of both the hollow vent housing 80 and the tubular inflator housing 11. In an exemplary embodiment, used in the testing that will be described later, the tubular inflator housing 11, the hollow support housing 70 and the vent housing 80 were made of a high strength cold drawn steel.

A hollow support 51 for supporting the rupturable closure member 60 is disposed inside the assembly of the hollow support housing and the vent housing. The hollow support 51 is shown in greater detail in FIGS. 3, 4 and 5. The support 51 has a tapered portion 53 and an adjoining cylindrical portion 52. Both an inside diameter and an outside diameter of the tapered portion 53 have minimum sizes at an open smaller end 54 of the tapered portion. Both the inside and outside diameters of the tapered portion 53 increase to maximum sizes at a larger end 55 of the tapered portion that is adjacent to the cylindrical portion 52. The cylindrical portion 52 extends to an open end 56 of the support. A circumferentially extending flange 68 extends from the exterior of the cylindrical portion 52 for use in securing the hollow support to the hollow support housing in a manner that will be described later. In an exemplary embodiment, used in the testing that will be described later, the hollow support 51 was made of a cold drawn steel, but it could be made of any suitable material. The thickness of the wall of the exemplary hollow support was 2.2 millimeters, but this could be varied in dependence on the material used to manufacture the hollow support and the force that will be exerted upon the hollow support by the gas in the inflator housing via the rupturable closure member 60. In the exemplary embodiment the hollow support was manufactured by machining from bar stock. In the exemplary embodiment the exterior surface of the tapered portion has a diameter of 9.4 millimeters at the open smaller end 54 of the tapered portion, which increased to a diameter of 11.35 millimeters at the beginning of the cylindrical portion 52 of the hollow support, or put another way the taper of the tapered portion was 12 degrees. The axial length of the tapered portion was 9.5 millimeters. The overall length of the support was 23.5 millimeters.

Figure 3:
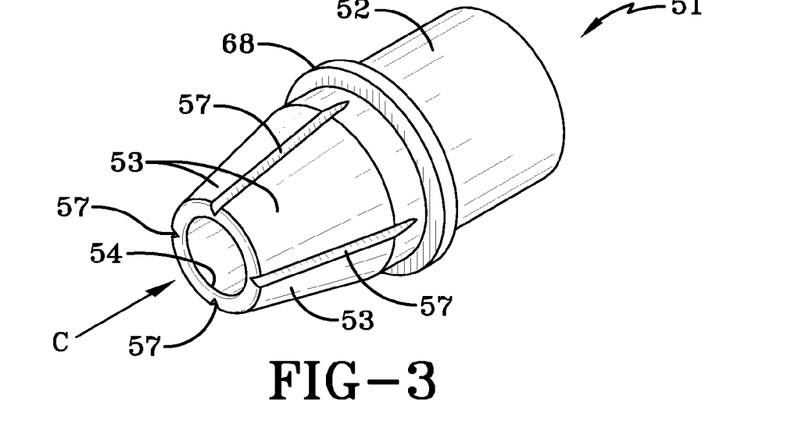
FIG. 3 is a perspective view of the support for a rupturable closure member that is a component of the new venting device.
Figure 4:
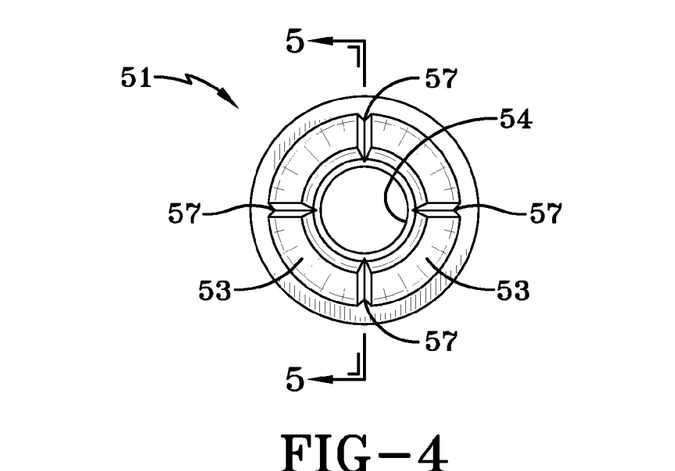
FIG. 4 is an end view of the support looking in the direction indicated by arrow C in FIG. 3.
Figure 5:
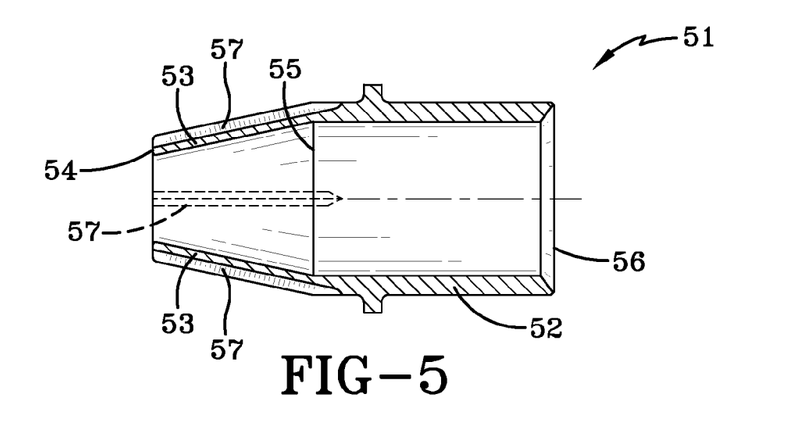
FIG. 5 is a longitudinal cross section of the support taken at line 5-5 of FIG. 4.

An exterior surface of the tapered portion 53 has longitudinally extending grooves 57 therein. In an exemplary embodiment, used in the testing that will be described later, the longitudinally extending grooves 57 were cut into the outside of the tapered portion 53 of the support using a milling operation. In axial cross section the longitudinally extending grooves have a "V" shaped profile, with the bases of the grooves being a sharp point. In the exemplary embodiment the sides of the "V" shaped profile of the grooves form a sixty degree included angle. The thickness of the wall of the tapered portion at the bottom of the "V" shaped groove was 0.4 millimeter. In an exemplary embodiment, used in the testing that will be described later, there were four longitudinally extending grooves 57 spaced ninety degrees apart around the circumference of the tapered portion 53 of the hollow support 51. The number of grooves may be varied, but at least two grooves are necessary.

An igniter 3 is located adjacent the cylindrical portion 52 of the support 51. A shorting clip 90 surrounds the electrical connectors 4 of the igniter 3 in a conventional manner to prevent unintentional activation of the igniter by static electricity. It is to be understood that the igniter shown in the drawings is only exemplary, and that any suitable igniter, of which many are known in the art, may be used in the practice of the present invention. While only a portion of the igniter 3 is shown located inside the hollow support 51, it is understood that the igniter may be placed adjacent to an end of the cylindrical portion 52 of the hollow support in any suitable configuration. A pyrotechnic substance 5 is located in the cylindrical portion 52 of the support 51 between the igniter 3 and the tapered portion 53 of the support. The pyrotechnic substance 5 can conveniently be located in a container 7 that is attached to the igniter 3 by welding or any other suitable means for attachment at an opposite end of the igniter from the electrical connectors 4 of the igniter.

The cylindrical portion 52 of the support 51 is disposed at least partially within the support housing 70 and is fixed to at least one interior surface of the support housing such that the tapered portion of the support extends beyond the support housing 70 into the vent housing 80.

The rupturable closure member 60 is forced against the open first end 54 of the tapered portion 53 of the support 51 by the gas 6 in the inflator housing 11 such that a chamber 58 is formed within the support 51.

The assembly of a venting device 50 with a housing 11 of a pressure vessel such as an airbag inflator can be best described with reference to FIGS. 2 and 9. FIG. 2 is an enlarged longitudinal cross section of the venting device and FIG. 9 is an exploded longitudinal cross section in perspective of the venting device. The rupturable closure member 60 is attached to the vent housing 80 in a gas tight manner, such as by welding, such that the rupturable closure member 60 seals the gas outlet passage 83.

The igniter 3 with electrical connector 4 is provided assembled with the container 7 containing the pyrotechnic substance 5 in a conventional manner, and this assembly is inserted into the hollow support member 70 such that the electrical contacts 4 are accessible from the exterior of the hollow support member and the igniter adjoins one or more complementary surfaces on the inside of the support housing 70. The shorting clip 9 is pressed into an end of the hollow support member 70 such that the electrical contacts 4 are disposed in a functional relationship with respect to the shorting clip 9. The hollow support 51 is slid over the container 7 containing the pyrotechnic substance 5 such that the pyrotechnic substance is located in the cylindrical portion 52 of the support between the igniter 3 and the tapered portion 53 of the support. In this exemplary venting device the circumferentially extending flange 68 of the support is fitted against a ledge 73 inside the support housing, and a circumferential rim 72 of the support housing is bent over radially inwardly to secure the cylindrical portion 52 of the support 51 to the support housing 70. The hollow support housing 70 is then placed adjacent the vent housing 80 with the tapered portion 53 of the support 51 inside the interior chamber 85 of the vent housing with 80 the open smaller end 54 of the tapered portion of the support adjacent the rupturable closure member 60. The support housing 70 is then attached to the vent housing 80, such as by a weld 88 to provide an assembled venting device 50.

The assembled venting device 50 is joined to the inflator housing 11 when an end wall 82 of the hollow vent housing 80 is fixed to one end of the tubular inflator housing 11 with a weld 87.

Figure 6:
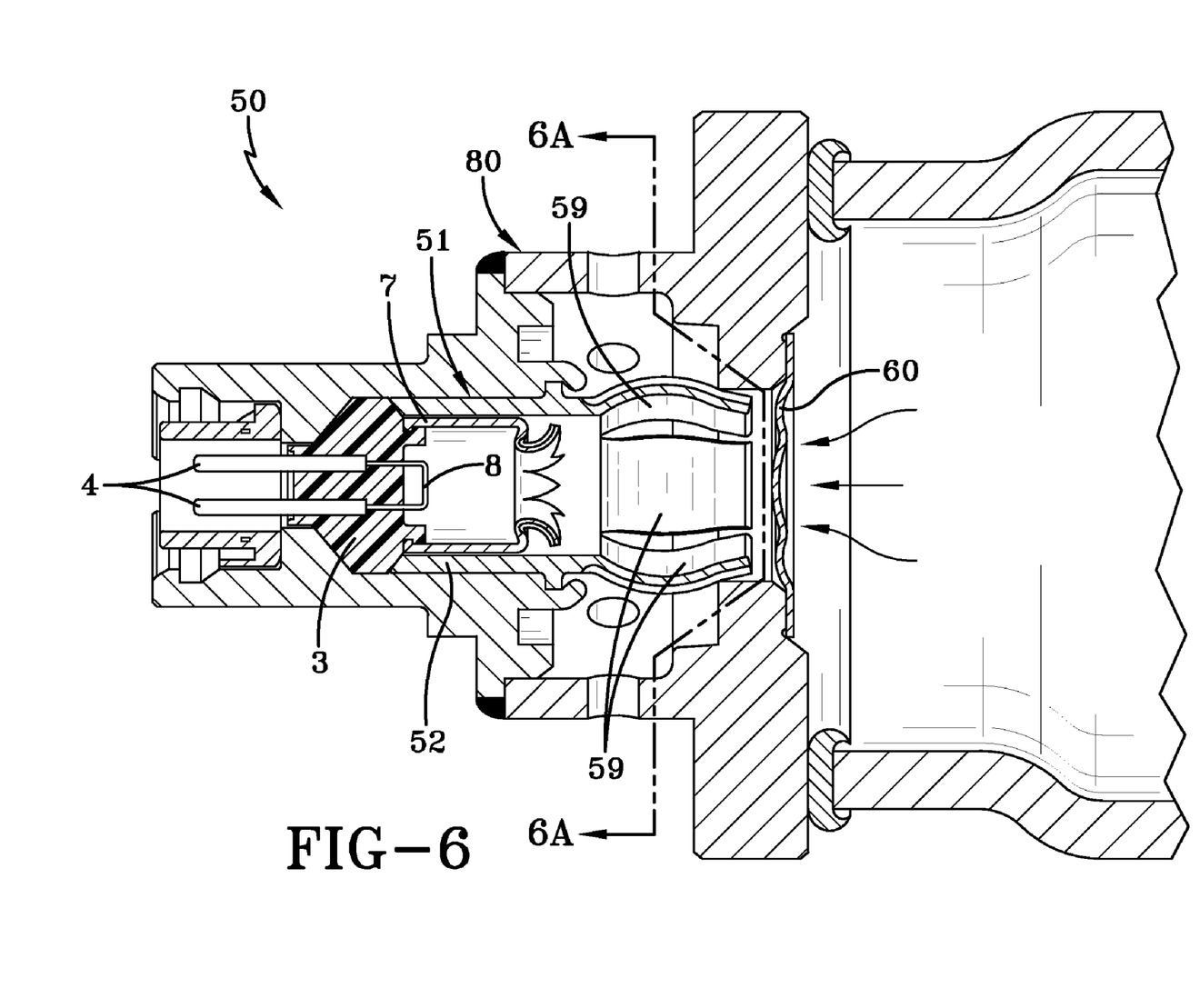
FIG. 6 is a longitudinal cross section of the venting device in a first stage of deformation after the venting device has been activated but before the rupturable closure member has ruptured.
Figure 6A:
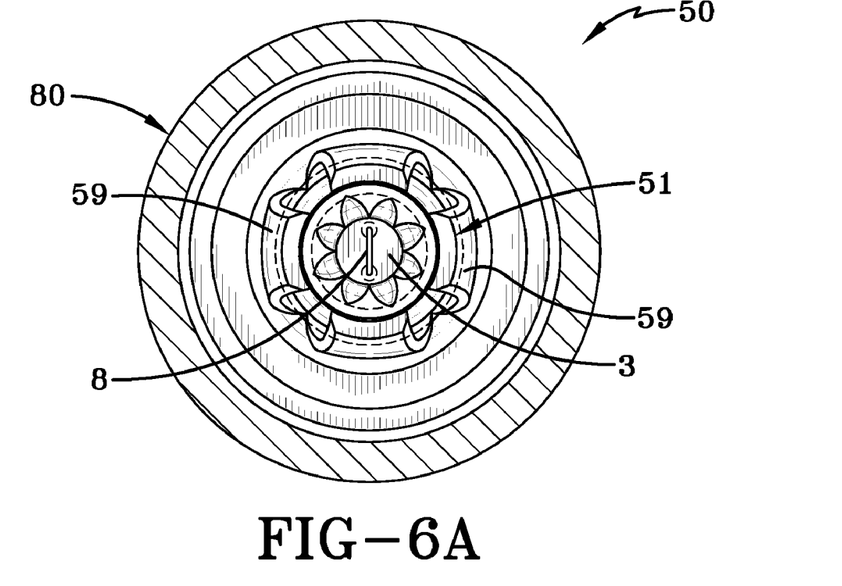
FIG. 6A is a cross section of the venting device taken at line 6A-6A of FIG. 6.

The operation of the venting device is best understood by next referring to FIG. 6 which is a longitudinal cross section of the venting device 50 in a first stage of deformation after the venting device has been activated but before the rupturable closure member 60 has ruptured. FIG. 6A is a cross section at line 6A-6A of FIG. 6. When a controller (not shown) determines that the venting device should be activated an electric current is sent to the electrical connectors 4 of the igniter 3 in a manner that is well known in the art. As the electric current passes through the bridge wire 8 the electrical resistance of the bridge wire generates heat that ignites the pyrotechnic substance 5. The burning pyrotechnic substance generates gas under pressure that causes the container 7 to rupture allowing the generated gas to enter the chamber 58 within the support 51. The shock wave and pressure inside the tapered portion 53 of the support 51 causes the tapered portion to break along the longitudinally extending grooves 57 resulting in the transformation of the tapered portion of the support into individual petals 59 that extend from the intact cylindrical portion 52 of the support. The deformation of the tapered portion of the support radially outwardly naturally reduces the length of the support such that the support is spaced apart from the rupturable closure member 60. This spacing is shown in FIG. 6 and exists for only the briefest of moments.

Figure 7:
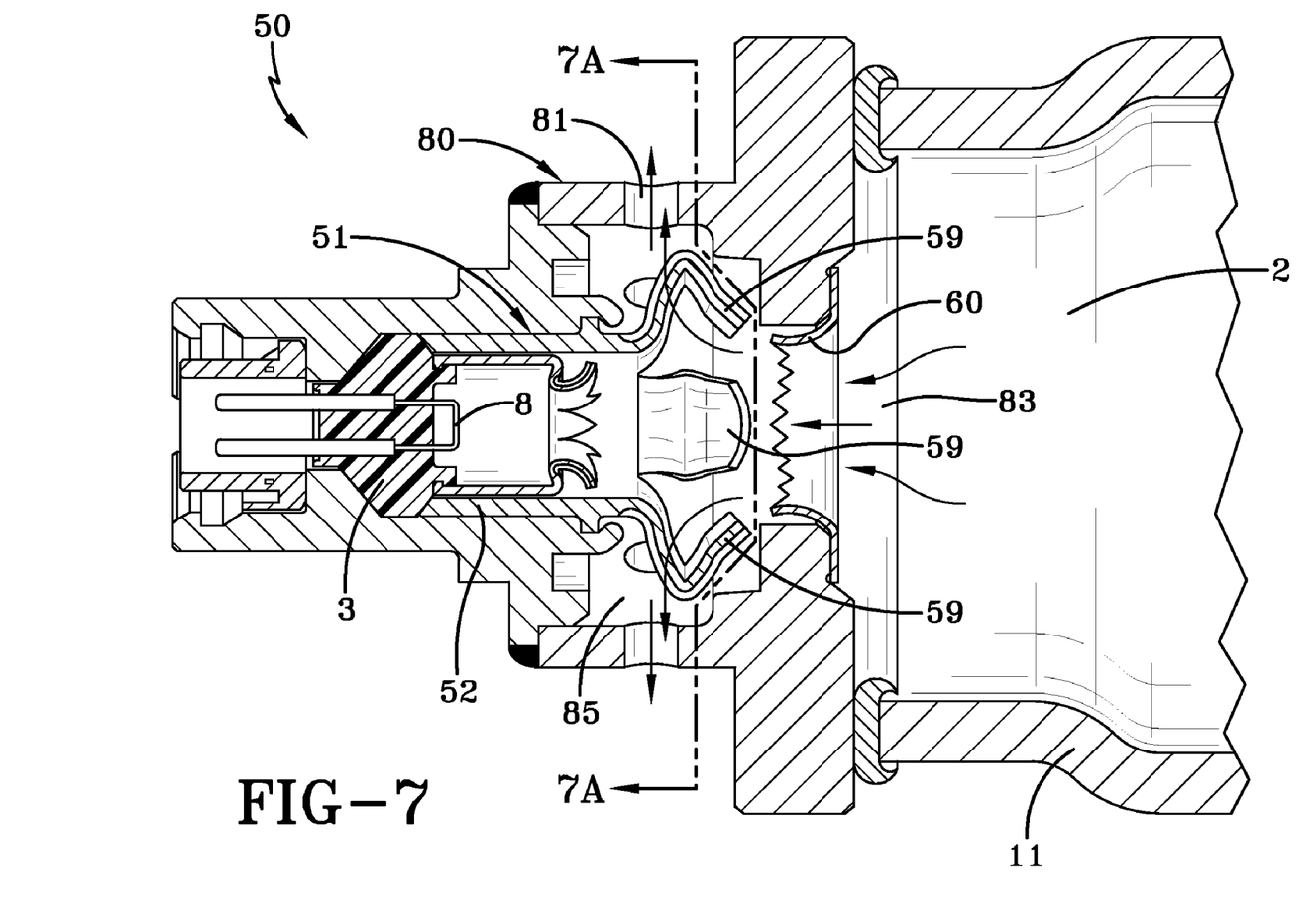
FIG. 7 is a longitudinal cross section of the venting device in a second stage of deformation after the venting device has been activated and after the rupturable closure member has ruptured.
Figure 7A:
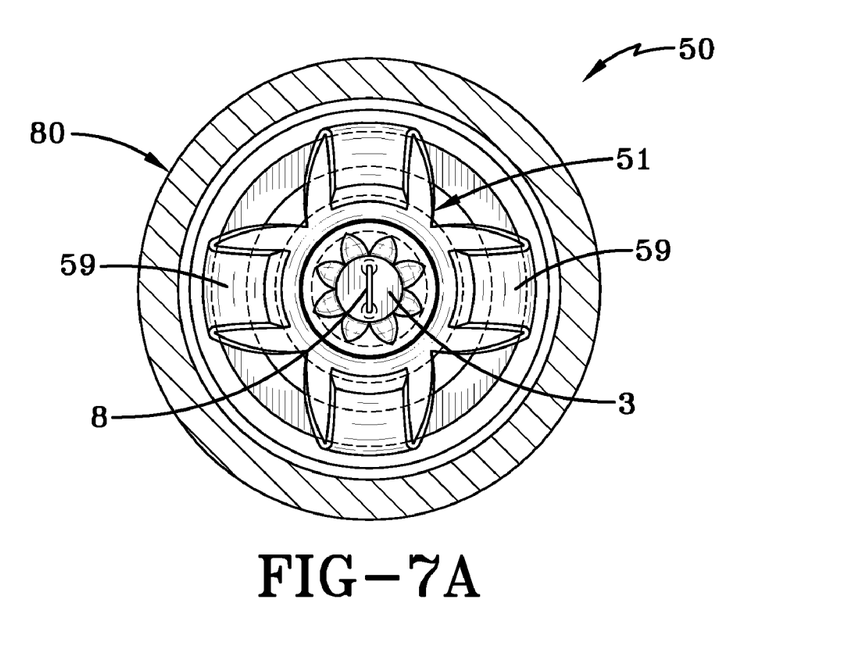
FIG. 7A is a cross section of the venting device taken at line 7A-7A of FIG. 7.

FIG. 7 is a longitudinal cross section of the venting device 50 in a second stage of deformation after the venting device has been activated and the rupturable closure member 60 has ruptured. FIG. 7A is a cross section at line 7A-7A of FIG. 7. After the support 51 is no longer in contact with the rupturable closure member 60 the gas in the inflator housing 11 will rupture the unsupported rupturable closure member. The highly pressurized gas rushing from the interior chamber 2 of the inflator housing 11 through the gas outlet passage 83 into the interior chamber 85 of the vent housing 80 further deforms the individual petals 59 that extend from the intact cylindrical portion 52 of the support by bending the petals radially outwardly such that each petal 59 assumes a rough V shape. This phenomena results in a very unobstructed flow path for the escaping gas to leave the vent housing 80 and the inflator through at least one, but preferably multiple, gas escape openings 81 in the vent housing as indicated by the arrows in FIG. 7. The gas escape openings 81 are preferably oriented in a radially opposing fashion to create a thrust neutral exhausting of the gasses. In this way no severe loading of the inflator or its attachment to a module housing is at risk.

Preferably the area of the gas outlet passage 83 and the collective area of the gas escape openings 81 are larger in area than the passage 34 through the washer shaped body 34 and the tubular inflator housing 11 and the downstream openings 20 in the manifold 14 such that the pressurized gasses primarily are exhausted directly from the inflator 100 via the venting device 50 rather than through primary vent port assembly 30. Accordingly the speed of gas venting is assisted by the pressure contained in the inflator at the onset and as the gas tries to escape under this pressure it moves through the venting device 50 as a path of least flow resistance.

Figure 8:
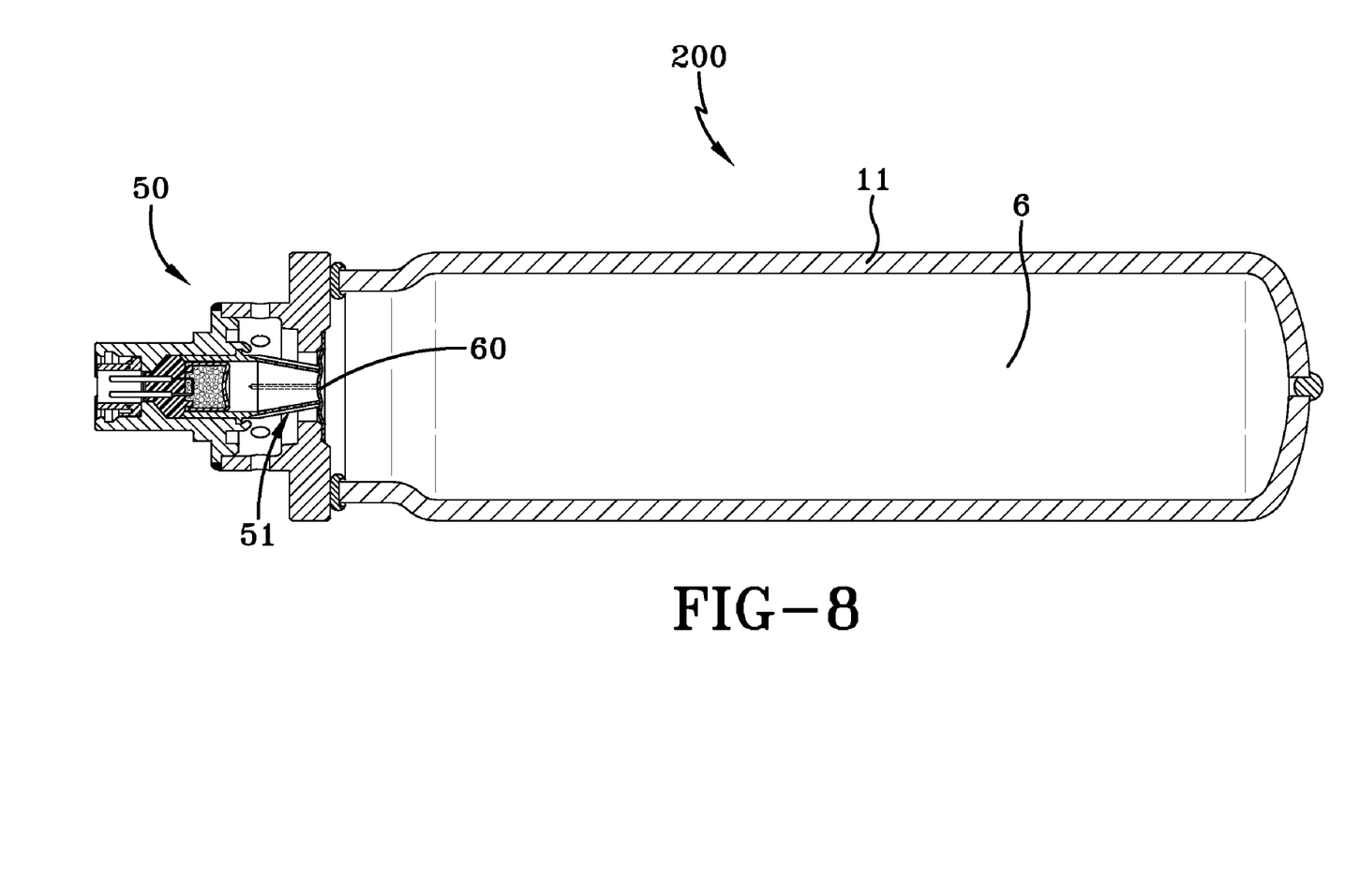
FIG. 8 is a longitudinal cross section of a stored gas vessel, such as a cold gas airbag inflator without a heater assembly, equipped with the new venting device.

FIG. 8 is a longitudinal cross section of a pressure vessel 200 for storing gas, such as a cold gas airbag inflator without a heater assembly, equipped with the new venting device 50. Pressurized gas 6 is stored inside a housing 11. The support 51 of the venting device supports a rupturable closure member 60 as described above. The venting device 50 has the structure described above and functions as described above. In this embodiment the venting device 50 is the only way for the stored gas 6 to be released from the housing 11.

Figure 10:
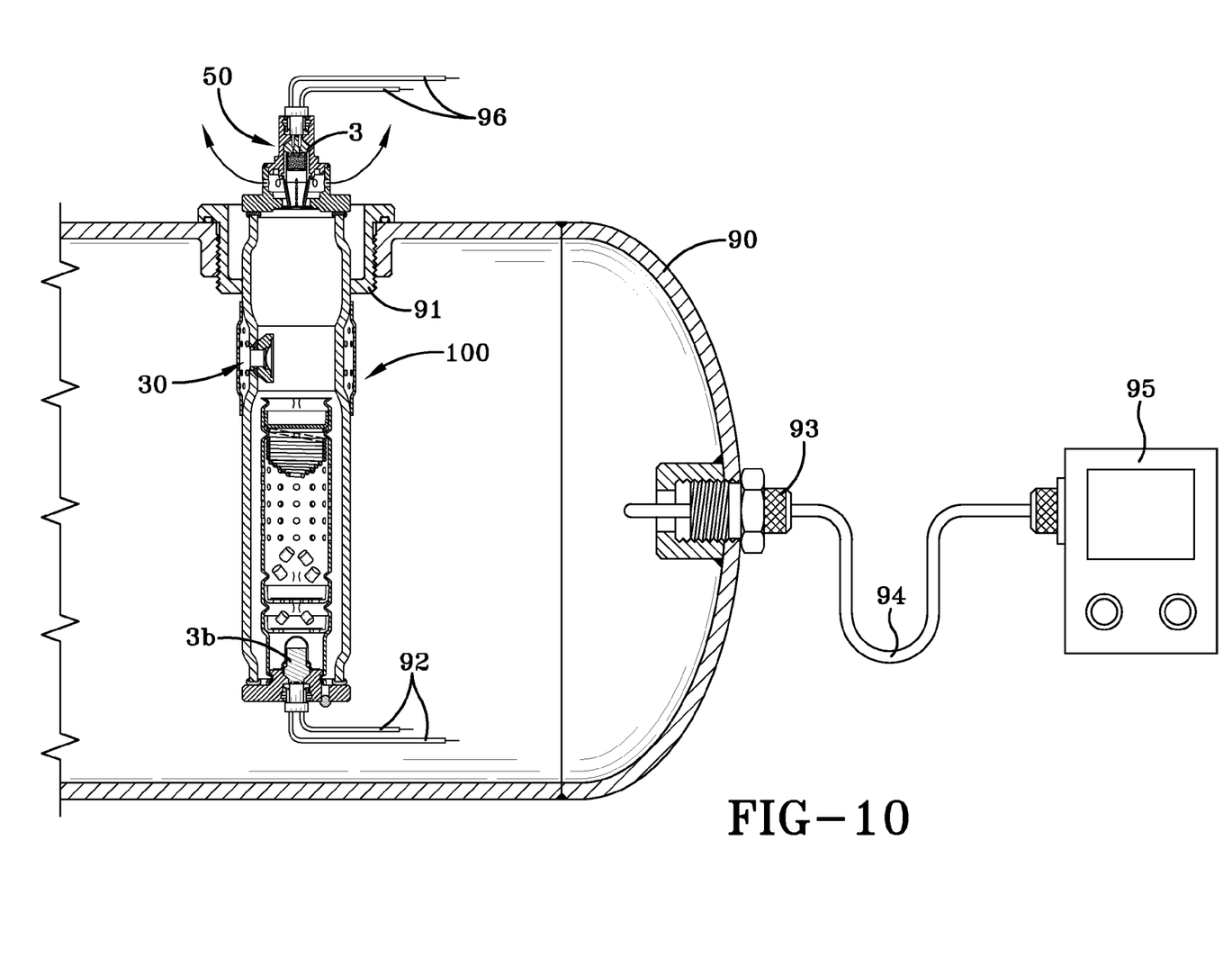
FIG. 10 is a schematic of a testing apparatus and procedure used for evaluating the effectiveness of venting devices.

The advantage of a venting device according to the present invention with a hybrid airbag inflator like that shown in FIG. 1 has been evaluated using a testing apparatus and procedure shown schematically in FIG. 10. A closed tank 90 having an internal volume of sixty liters was adapted to have an opening sized to accommodate the airbag inflator 100 of FIG. 1 with from one end of the inflator inside the tank and the opposite end of the inflator, including the venting device located outside of the tank. The primary vent port assembly 30 is located inside the tank. The inflator 100 is secured in this position by a suitable fixture 91. A seal between fixture 91 or a wall of the tank and the inflator housing 11 prevents gas from escaping between the wall of the tank and the inflator housing. Wires 92 extend from a control device (not shown) to the electrical connectors of a first igniter 3b and an electric current is transmitted through these wires to activate the igniter 3b. The hybrid inflator 100 functions in a manner that has already been described above and gasses begin to exit the hybrid inflator into the tank 90 via the primary vent port assembly 30. At least one pressure transducer 93 senses the gas pressure inside the tank during the deployment of the hybrid inflator 100. The pressure transducer 93 sends a signal to a data recorder 95 via a cable 94. Wires 96 extend from the control device to the electrical connectors of an igniter 3 of the venting device 50 and an electric current is transmitted through these wires to activate the igniter 3. At a selected interval, for the tests described herein about 20 milliseconds, after the first igniter 3b was activated the igniter 3 of the venting device 50 is activated and the gases that exit the hybrid inflator via the venting device do not enter the tank, but rather are vented to atmosphere. The speed at which the pressure inside the tank decreases after the venting device is activated is an indication of the efficiency of the venting device. That is to say, the objective of the venting device is to rapidly decrease the flow of gas from the inflator to an airbag. This is important if the venting device is to limit the force with which an airbag contacts a vehicle occupant if a controller determines that a vehicle occupant is out-of-position or smaller than a selected size.

Figure 11:
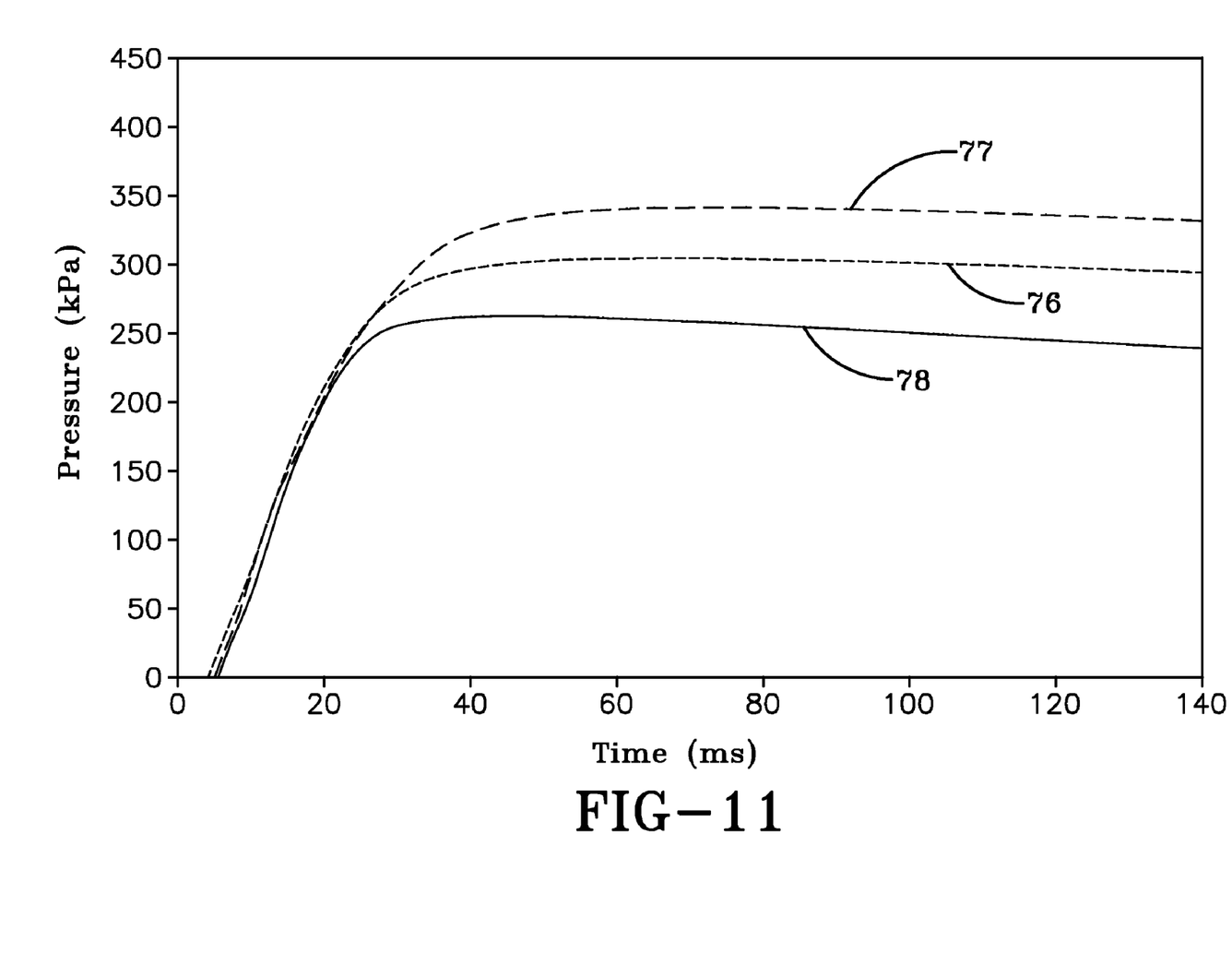
FIG. 11 is a graph showing results obtained using the testing apparatus and procedure represented in FIG. 10.

FIG. 11 is a graph showing results obtained using the testing apparatus and procedure represented in FIG. 10.

Figure 12:
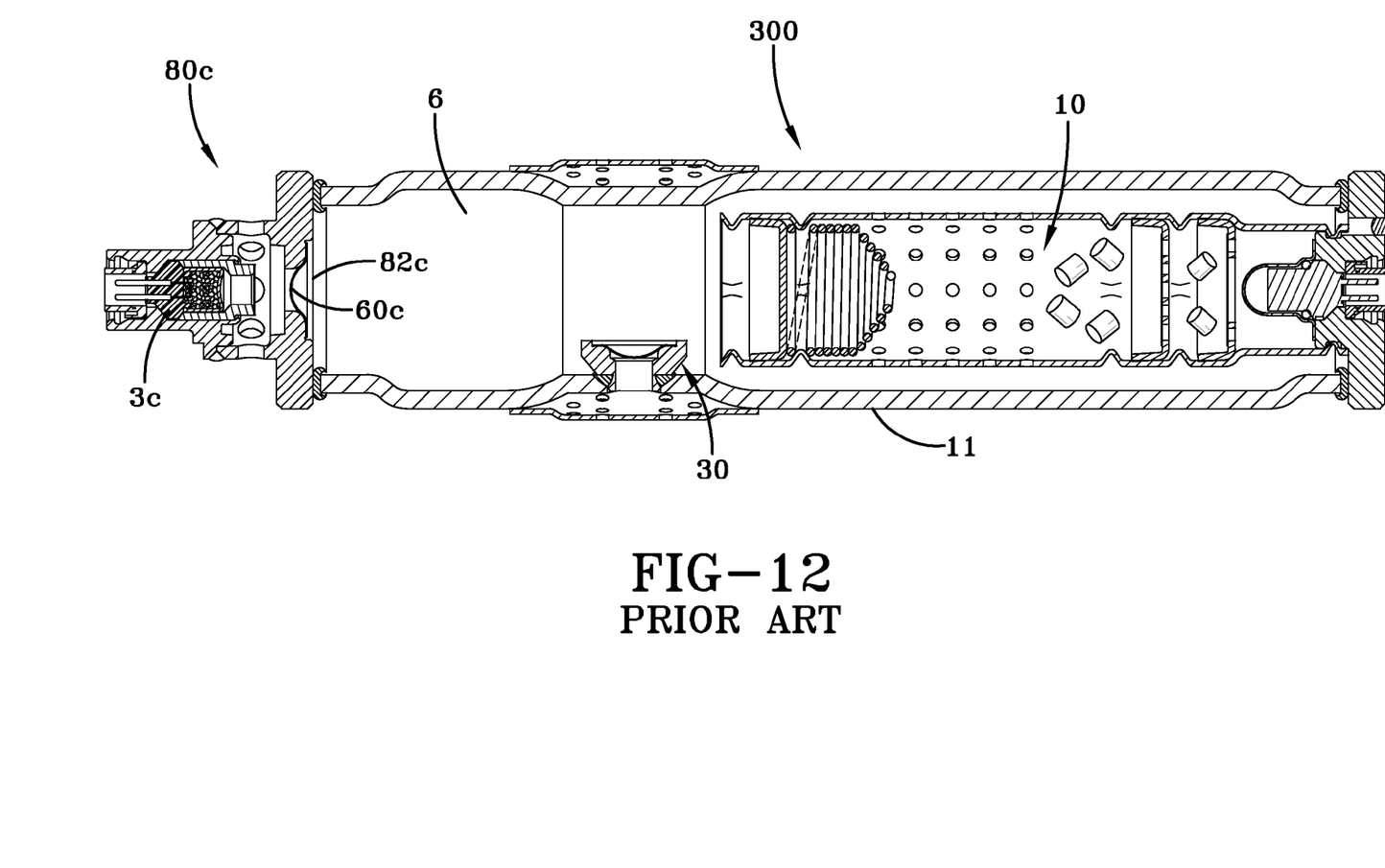
FIG. 12 is a cross section of a prior art hybrid airbag inflator used in the tests for evaluating the effectiveness of venting devices.

Curve 76 in FIG. 11, which is a series of short dashes, shows the results of the above-described tank test when a hybrid inflator 300 like that shown in FIG. 12 having a venting device 80c with an unsupported rupturable closure member 60c ruptured only by the shock wave and pressure from an igniter 3c and a small charge of a pyrotechnic material only. Due to the very high pressure inside the inflator housing the gas outlet passage 82c has a diameter of only eight millimeters, if the diameter were larger the rupturable closure member would of necessity need to be so robust that opening the unsupported closure member with an igniter and a small charge of a pyrotechnic material only may not be satisfactory and dependable. With the exception of the venting device the prior art inflator 300 of FIG. 12 is like the hybrid airbag inflator 100 of FIG. 1. The hybrid airbag inflator of FIG. 12 is more fully described with respect to FIG. 6 of US 2007/0075536A1 which is incorporated herein in its entirety for the purpose of teaching such a hybrid airbag inflator. Simply put, curve 76 shows the results when a hole is blown through an eight millimeter diameter unsupported closure member using only an igniter and a small pyrotechnic charge.

Curve 77, which is a series of long dashes, shows the results of the above-described tank test when a hybrid inflator like that shown in FIG. 1 and a venting device like that disclosed herein with one important difference. The support 51 used in this test did not have any longitudinally extending grooves in the outer surface of the tapered portion of the support. The gas outlet passage 83 has a larger diameter of twelve millimeters because the supported rupturable closure can better withstand the pressure inside the inflator housing. In the absence of longitudinal grooves in the tapered portion of the support, the support merely functions to focus the shock wave and pressure from the pyrotechnic material on a portion of the closure that actually is a wall of the chamber in the hollow support member. The gas pressure inside the inflator housing deforms the closure around the support in the manner disclosed in U.S. Pat. No. 6,908,106 B2 and U.S. Pat. No. 7,131,663 B1 discussed in the introductory portion of the present document such that the only way for gasses to exit the container is to pass around the exterior of the support which limits the cross sectional area of the passageway for the gas being vented.

Curve 78, which is a solid line, shows the results of the above-described tank test when a hybrid inflator 100 like that shown in FIG. 1 and fitted with a venting device 50 according to the present invention wherein the outer surface of the tapered portion of the support with does have longitudinally grooves therein as described above. The gas outlet passage 83 has a diameter of twelve millimeters, and employs an identical rupturable closure member to that used in the test that generated curve 77.

The curves 76, 77 and 78 of FIG. 11 represent the inflation pressure inside an airbag with respect to elapsed time from the start of the inflation process. The tests simulate a situation wherein after beginning the deployment and inflation of an airbag a controller determines a vehicle occupant that the airbag is intended to restrain is out-of-position or of a small size and further deployment of the airbag needs to be terminated or slowed. In these tests the venting devices to vent gas outside of the tank were activated twenty milliseconds after the beginning of the inflation process. Therefore, the lower the pressure in the tank after the activation of the venting device (in these curves beginning at twenty milliseconds on the X axis) the more effectively the venting device functioned. Clearly the venting device according to the present invention as represented by curve 78 is superior to the other venting devices tested.

Many changes and modifications in the above-described embodiments of the invention can, of course, be carried out without departing from the scope thereof. Accordingly, that scope is intended to be limited only by the scope of the appended claims.

What is claimed is:

1. A device for supporting a rupturable closure member of a pressure vessel, the device comprising:

a hollow support having a tapered portion and an adjoining cylindrical portion, both an inside diameter and an outside diameter of the tapered portion having minimum sizes at an open first end of the support, both the inside and outside diameters of the tapered portion of the support increasing to maximum sizes at a second end of the tapered portion that is adjacent to a first end of the cylindrical portion, and the cylindrical portion extending to an open second end of the support, an exterior surface of the tapered portion having longitudinally extending grooves therein;

an igniter located adjacent the cylindrical portion of the support;

a pyrotechnic substance located in the cylindrical portion of the support.

2. The device for supporting a rupturable closure member of a pressure vessel according to claim 1 further comprising a hollow support housing, the cylindrical portion of the support being fixed to an interior of the support housing such that the tapered portion of the support extends beyond the support housing.

3. The device for supporting a rupturable closure member of a pressure vessel according to claim 2 further comprising a hollow vent housing fixed to the support housing such that the tapered portion of the support is located inside the vent housing, the vent housing having passageways therethrough that are oriented radially with respect to a longitudinal axis of the vent housing.

4. The device for supporting a rupturable closure member of a pressure vessel according to claim 3 further comprising a rupturable closure member fixed to the vent housing axially aligned with the first end of the tapered portion of the support such that the first end of the tapered portion of the support contacts the rupturable closure member when the rupturable closure member is deformed in a direction towards the support.

5. An airbag inflator containing gas under pressure, said airbag inflator comprising:

an inflator housing with an outlet passage through which the gas flows from the inflator housing;

a rupturable closure member blocking flow of the gas from the inflator housing;

a device for supporting the rupturable closure member, the device comprising a hollow support having a tapered portion and an adjoining cylindrical portion, both an inside diameter and an outside diameter of the tapered portion having minimum sizes at an open smaller end of the tapered portion, both the inside and outside diameters of the tapered portion increasing to maximum sizes at a larger end of the tapered portion that is adjacent to the cylindrical portion, and the cylindrical portion extending to an open second end of the support, an exterior surface of the tapered portion having longitudinally extending grooves therein; an igniter located adjacent the cylindrical portion of the support; a pyrotechnic substance located in the cylindrical portion of the support;

the rupturable closure member being forced against the open first end of the tapered portion of the support by the gas in the inflator housing such that a chamber is formed within the support, the igniter when activated ignites the pyrotechnic substance and the burning pyrotechnic substance generates gas under pressure that causes the tapered portion of the support to break along the longitudinally extending grooves and no longer support the rupturable closure member allowing the gas in the inflator housing to rupture the unsupported rupturable closure member.

6. The airbag inflator according to claim 5 wherein the device for supporting the rupturable closure member further comprises a hollow support housing, the cylindrical portion of the support being fixed to an interior of the support housing such that the tapered portion of the support extends beyond the support housing; and a hollow vent housing fixed to the support housing such that the tapered portion of the support is located inside the vent housing, the vent housing having passageways therethrough that are oriented radially with respect to a longitudinal axis of the vent housing, the vent housing being fixed to the inflator housing.

7. The airbag inflator according to claim 6 wherein the rupturable closure member is fixed to the vent housing axially aligned with the first end of the tapered portion of the support.

8. An airbag inflator comprising:

a tubular inflator housing containing gas under pressure, the inflator housing having two ends with an outlet passage at one end of the inflator housing sealed by a rupturable closure member blocking the flow of gas from the inflator housing, wherein gas can flow from the inflator housing upon the rupturing of the rupturable closure member;

a device fixed to said one end of the inflator housing for supporting the rupturable closure member, the device comprising a hollow support having a tapered portion and an adjoining cylindrical portion, both an inside diameter and an outside diameter of the tapered portion having minimum sizes at an open smaller end of the tapered portion of the support, both the inside and outside diameters of the tapered portion increasing to maximum sizes at a larger end of the tapered portion that is adjacent to the cylindrical portion, and the cylindrical portion extending to an open end of the support, an exterior surface of the tapered portion having longitudinally extending grooves therein; an igniter located adjacent the cylindrical portion of the support; a pyrotechnic substance located in the cylindrical portion of the support;

the rupturable closure member being forced against the open first end of the tapered portion of the support by the gas in the inflator housing such that a chamber is formed within the support, the igniter when activated ignites the pyrotechnic substance and the burning pyrotechnic substance generates gas under pressure that causes the tapered portion of the support to break along the longitudinally extending grooves and no longer support the rupturable closure member allowing the gas in the inflator housing to rupture the unsupported rupturable closure member.

9. The airbag inflator according to claim 8 wherein the device for supporting the rupturable closure member further comprises a hollow support housing, the cylindrical portion of the support being fixed to at least one interior surface of the support housing such that the tapered portion of the support extends beyond the support housing; and a hollow vent housing fixed to the support housing such that the tapered portion of the support is located inside the vent housing, the vent housing having at least one gas escape passageway therethrough that is oriented radially with respect to a longitudinal axis of the vent housing, the vent housing being fixed to said one end of the inflator housing with the outlet passage being located in the vent housing, the rupturable closure member being fixed to the vent housing axially aligned with the first end of the tapered portion of the support.

10. The airbag inflator according to claim 8 further comprising a vent port assembly affixed to the tubular inflator housing and spaced apart from and between the ends of the tubular inflator housing.

11. An airbag inflator comprising:
a tubular inflator housing containing gas under pressure, the tubular inflator housing having two ends and a longitudinal axis;
a hollow vent housing having an end wall fixed to one end of the tubular inflator housing, the vent housing having a longitudinal axis that is coaxial with the longitudinal axis of the tubular inflator housing, the end wall of the vent housing having a gas outlet passage therethrough such that an interior chamber of the vent housing communicates with an interior chamber of the inflator housing via the gas outlet passage;
a rupturable closure member fixed to the vent housing blocking the flow of gas through the outlet passage from inside the inflator housing through the outlet passage to inside the vent housing, and the vent housing having at least one gas escape opening therethrough oriented radially with respect to the longitudinal axis of the vent housing to allow gas to pass from inside the vent housing to outside the vent housing;
a hollow support housing fixed to the vent housing, the hollow support housing having a longitudinal axis that is coaxial with the longitudinal axes of both the vent housing and the inflator housing;
a hollow support for supporting the rupturable closure member, the support having a tapered portion and an adjoining cylindrical portion, both an inside diameter and an outside diameter of the tapered portion having minimum sizes at an open smaller end of the tapered portion, both the inside and outside diameters of the tapered portion increasing to maximum sizes at a larger end of the tapered portion that is adjacent to the cylindrical portion, and the cylindrical portion extending to an open end of the support, an exterior surface of the tapered portion having longitudinally extending grooves therein, the cylindrical portion of the support being fixed to at least one interior surface of the support housing such that the tapered portion of the support extends beyond the support housing into the vent housing;
an igniter is located adjacent of the cylindrical portion of the support;
a pyrotechnic substance located in the cylindrical portion of the support;
the rupturable closure member being forced against the open first end of the tapered portion of the support by the gas in the inflator housing such that a chamber is formed within the support, the igniter when activated ignites the pyrotechnic substance and the burning pyrotechnic substance generates gas under pressure that causes the tapered portion of the support to break along the longitudinally extending grooves and no longer support the rupturable closure member allowing the gas in the inflator housing to rupture the unsupported rupturable closure member.

12. The airbag inflator according to claim 11 further comprising a vent port assembly affixed to the tubular inflator housing and spaced apart from and between the ends of the tubular inflator housing.

\* \* \* \* \*